(12) United States Patent
Tseng

(10) Patent No.: US 11,481,349 B2
(45) Date of Patent: Oct. 25, 2022

(54) DYNAMIC SWITCHING METHOD

(71) Applicant: Cheng Uei Precision Industry Co., Ltd., New Taipei (TW)

(72) Inventor: Chin Huang Tseng, New Taipei (TW)

(73) Assignee: Cheng Uei Precision Industry Co., Ltd., New Taipei (TW)

(*) Notice: Subject to any disclaimer, the term of this patent is extended or adjusted under 35 U.S.C. 154(b) by 0 days.

(21) Appl. No.: 17/335,051

(22) Filed: May 31, 2021

(65) Prior Publication Data

US 2021/0318974 A1 Oct. 14, 2021

Related U.S. Application Data

(62) Division of application No. 16/844,250, filed on Apr. 9, 2020, now Pat. No. 11,163,712.

(51) Int. Cl.
*G06F 13/38* (2006.01)
*G06F 13/40* (2006.01)

(52) U.S. Cl.
CPC ........ *G06F 13/385* (2013.01); *G06F 13/4022* (2013.01); *G06F 2213/0042* (2013.01)

(58) Field of Classification Search
CPC .............. G06F 13/385; G06F 13/4022; G06F 2213/0042
See application file for complete search history.

(56) References Cited

U.S. PATENT DOCUMENTS

2016/0170932 A1* 6/2016 Lin .................. G06F 13/4282
710/313

* cited by examiner

*Primary Examiner* — Idriss N Alrobaye
*Assistant Examiner* — Ronald T Modo
(74) *Attorney, Agent, or Firm* — Lin & Associates Intellectual Property, Inc.

(57) ABSTRACT

A dynamic switching method is applied to an electronic switching device. Judge whether insertion and withdrawal times between the electronic switching device and a USB cable reach a preset threshold value. Start a UART function of the electronic switching device temporarily. Judge whether an instruction of starting the UART function sent by the USB cable is received. If a recognition program unit receives the instruction of starting the UART function, the recognition program unit starts the UART function. Execute the UART function. Judge whether the electronic switching device receives an instruction of stopping the UART function. Switch to an initial status. Change a start value of a UART circuit unit into an initial value of the UART circuit unit. Charge the electronic switching device through the USB cable.

12 Claims, 3 Drawing Sheets

DYNAMIC SWITCHING METHOD

CROSS-REFERENCE TO RELATED APPLICATION

This is a division of U.S. patent application Ser. No. 16/844,250, filed Apr. 9, 2020 and issued Nov. 2, 2021 as U.S. Pat. No. 11,163,712, which is incorporated herewith by reference in its entirety.

BACKGROUND OF THE INVENTION

1. Field of the Invention

The present invention generally relates to a switching device, and more particularly to an electronic switching device applied to the electronic switching device of an electronic product.

2. The Related Art

Usually, an electronic switching device is widely used in various electronic products. A conventional electronic switching device is chargeable. The conventional electronic switching device is driven by a rechargeable battery, and the rechargeable battery provides electricity for the conventional electronic switching device.

As is known to all, when the conventional electronic switching device is applied in the electronic product, such as a cell phone, after the conventional electronic switching device is used, the battery needs charging.

The conventional electronic switching device includes a connection interface and a power element. The connection interface is connected with an inside of the conventional electronic switching device, and the power element which is disposed in the conventional electronic switching device is connected with the connection interface. A computer provides the electricity for the conventional electronic switching device to charge the conventional electronic switching device through a computer interface and the connection interface.

The conventional electronic switching device further includes a power and UART (Universal Asynchronous Receiver/Transmitter) module disposed in the conventional electronic switching device. On one hand, in order to make the conventional electronic switching device capable of being charged by the computer, the connection interface is connected with the power element. On the other hand, in order to make the conventional electronic switching device capable of being in communication with the computer, the power and UART module is connected with the connection interface, and is a part of a hardware of the conventional electronic switching device to perform data transmission between a serial communication and a parallel communication, so that the computer supplies the electricity for the conventional electronic switching device to charge the conventional electronic switching device through the connection interface, and simultaneously the conventional electronic switching device is in communication with the computer for satisfying factory production tests, health management and other applications.

However, when the connection interface of the conventional electronic switching device is connected with the computer to make the conventional electronic switching device charged by the computer, the computer applies a windows operating system, and a display screen of the computer will display information that the device is unrecognized. Moreover, in the case that the connection interface of the conventional electronic switching device has a UART function which is started, the display screen will display the information that the device is unrecognized when the conventional electronic switching device is connected with the computer. The cause of the above-mentioned phenomenon is that the computer interface of the computer transmits and receives USB signals, and when the connection interface of the conventional electronic switching device receives UART signals and then transmits the UART signals to the computer, the windows operating system of the computer has no way of recognizing the UART signals, and the display screen of the computer displays the information that device is unrecognized.

Thus, it is essential to provide an innovative electronic switching device applied in an electronic product, and after a USB interface of the innovative electronic switching device is connected with the computer through a USB cable, a recognition program unit which is capable of switching UART function statuses of the innovative electronic switching device is urgently needed.

SUMMARY OF THE INVENTION

An object of the present invention is to provide a dynamic switching method applied to an electronic switching device. After a USB interface of the electronic switching device is connected with a computer through a USB cable, UART function statuses of the electronic switching device are dynamically switched by a recognition software program of a recognition program unit of a microprogrammed control module of the electronic switching device to start or stop a UART function. Specific steps of the dynamic switching method are described hereinafter. Step one: judge whether insertion and withdrawal times between the electronic switching device and the USB cable reach a preset threshold value in a first preset time and by a recognition software program of the recognition program unit compatible with the operating system of the computer, if the insertion and withdrawal times between the USB interface and the USB cable reach the preset threshold value in the first preset time, execute step two, if the insertion and withdrawal times between the USB interface and the USB cable do not reach the preset threshold value in the first preset time, execute step nine. Step two: start the UART function of the electronic switching device temporarily by virtue of the recognition program unit changing a value stored in a transient memory of the microprogrammed control module, and then execute step three. Step three: judge whether an instruction of starting the UART function sent by the USB cable and sent from the computer is received or not in a second preset time, if the instruction of starting the UART function sent by the USB cable and sent from the computer is received, execute step four, if the instruction of starting the UART function sent by the USB cable and sent from the computer is not received, execute step eight. Step four: if the recognition program unit receives the instruction of starting the UART function in the second preset time, the recognition program unit starts the UART function of the electronic switching device formally, and then execute step five. Step five: execute the UART function of the electronic switching device by virtue of the recognition program unit receiving the instruction of starting the UART function, and then execute step six. Step six: judge whether the electronic switching device receives an instruction of stopping the UART function sent from the computer or not by the recognition program unit, if the electronic switching device receives the instruction of stopping the UART function sent from the computer, execute step seven, the recognition program unit stops the UART function of the electronic switching device, the electronic switching device is switched to a general status, if the electronic switching device does not receive the instruction of stopping the UART function sent from the computer, execute the step five. Step seven: switch to an initial status, initialize program variables for preparing to change a start value of the UART circuit unit stored in the transient memory, after completing the preparation for changing the start value of the UART circuit unit, automatically execute step eight. Step eight: change a start value of a UART circuit unit which is stored in the transient memory of the microprogrammed control module into an initial value of the UART circuit unit which is stored in the transient memory by the recognition program unit, after completing executing the step eight, automatically execute the step nine. Step nine: charge the electronic switching device by the computer and through the USB cable.

Another object of the present invention is to provide a dynamic switching method applied to an electronic switching device. After a USB interface of the electronic switching device is connected with a computer through a USB cable, UART function statuses of the electronic switching device are dynamically switched by a recognition software program of a recognition program unit of a microprogrammed control module of the electronic switching device to start or stop a UART function. Specific steps of the dynamic switching method are described hereinafter. Step one: judge whether insertion and withdrawal times between the electronic switching device and the USB cable reach a preset threshold value in a first preset time and by a recognition software program of the recognition program unit compatible with an operating system of the computer, if the insertion and withdrawal times between the USB interface and the USB cable reach the preset threshold value in the first preset time, execute step two. Step two: start the UART function of the electronic switching device temporarily by virtue of the recognition program unit changing a value stored in a transient memory of the microprogrammed control module, and then execute step three. Step three: judge whether an instruction of starting the UART function sent by the USB cable and sent from the computer is received or not in a second preset time, if the instruction of starting the UART function sent by the USB cable and sent from the computer is received, execute step four. Step four: if the recognition program unit receives the instruction of starting the UART function in the second preset time, the recognition program unit starts the UART function of the electronic switching device formally, and then execute step five. Step five: execute the UART function of the electronic switching device by virtue of the recognition program unit receiving the instruction of starting the UART function, and then execute step six. Step six: judge whether the electronic switching device receives an instruction of stopping the UART function sent from the computer or not by the recognition program unit, if the electronic switching device receives the instruction of stopping the UART function sent from the computer, execute step seven, the recognition program unit stops the UART function of the electronic switching device, the electronic switching device is switched to a general status, if the electronic switching device does not receive the instruction of stopping the UART function sent from the computer, execute the step five. Step seven: switch to an initial status, automatically execute step eight. Step eight: change a start value of the UART circuit unit which is stored in the transient memory into an initial value of the UART circuit unit which is stored in the transient memory by the recognition program unit, after completing executing the step eight, automatically execute step nine. Step nine: charge the electronic switching device by the computer and through the USB cable.

As described above, the dynamic switching method applied to the electronic switching device is provided in the present invention, after the USB interface of the electronic switching device is connected with the computer through the USB cable, the recognition program unit of the microprogrammed control module of the electronic switching device switches the UART function statuses of the electronic switching device. Furthermore, the dynamic switching method has multiple advantages, the power supply is connected with the USB interface, so that the computer provides electricity to the power supply of the electronic switching device to charge the electronic switching device by the USB cable, the UART circuit unit is connected with the USB interface to make the UART circuit unit of the electronic switching device in communication with the computer for satisfying factory production tests, health managements and other applications. In addition, when the computer is connected with the USB interface to charge the electronic switching device through the USB cable, a display screen of the computer will not display information that the device is unrecognized.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
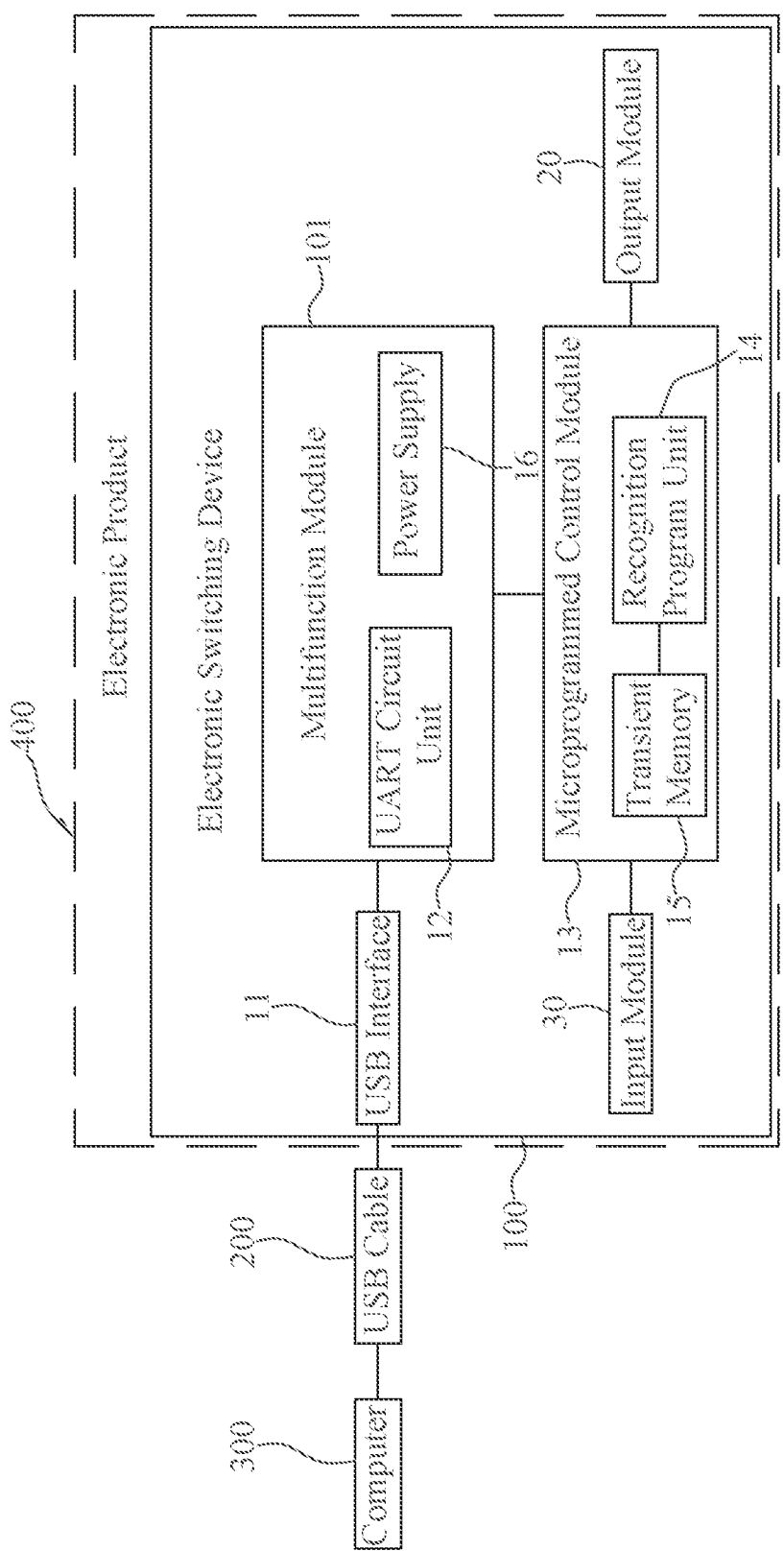
FIG. 1 is a block diagram showing that a USB interface of an electronic switching device of an electronic product in accordance with a preferred embodiment of the present invention is connected with a computer through a USB cable.
Figure 2:
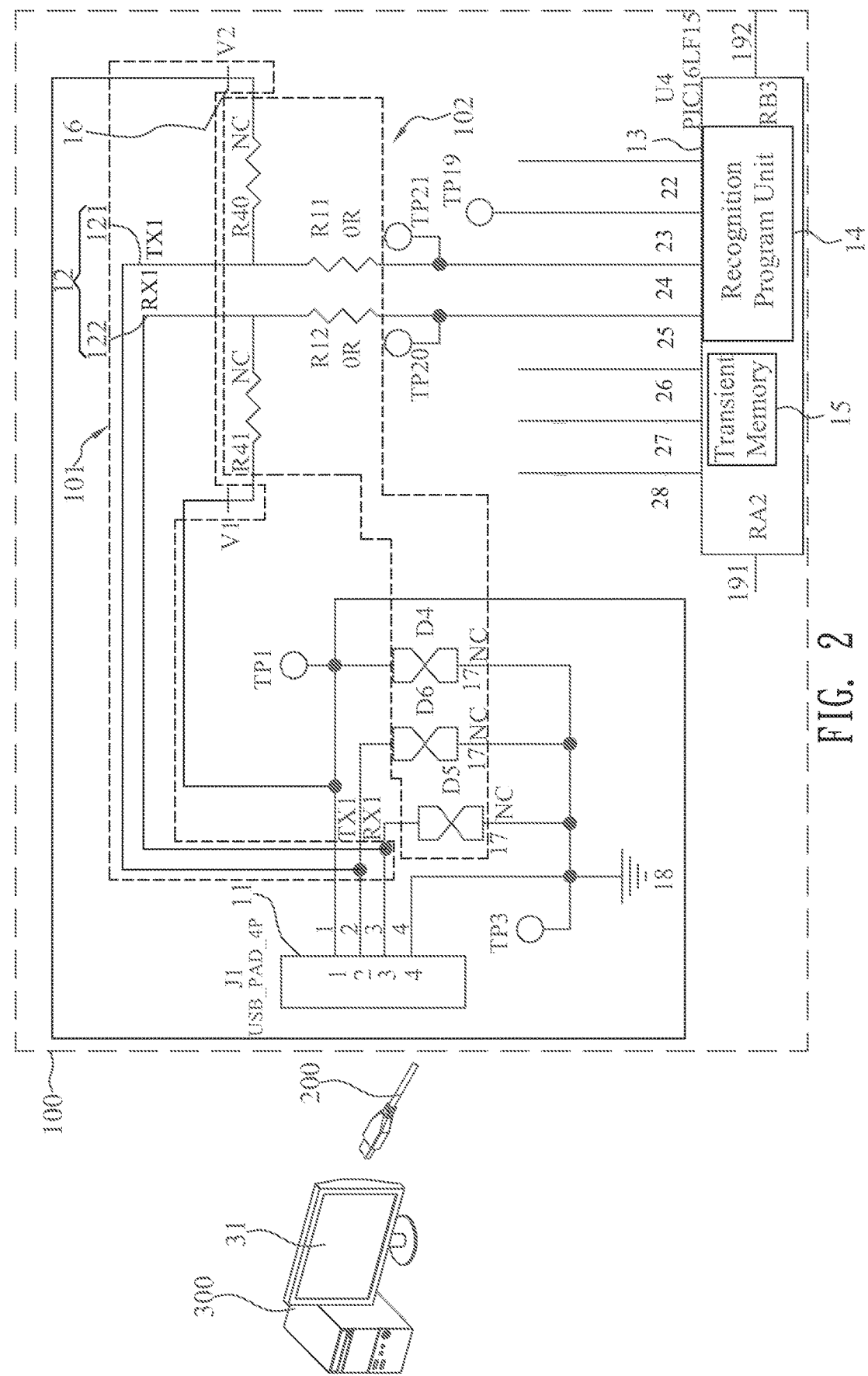
FIG. 2 is a diagrammatic drawing showing that the USB interface of the electronic switching device in accordance with the preferred embodiment of the present invention is connected with the computer through the USB cable.
Figure 3:
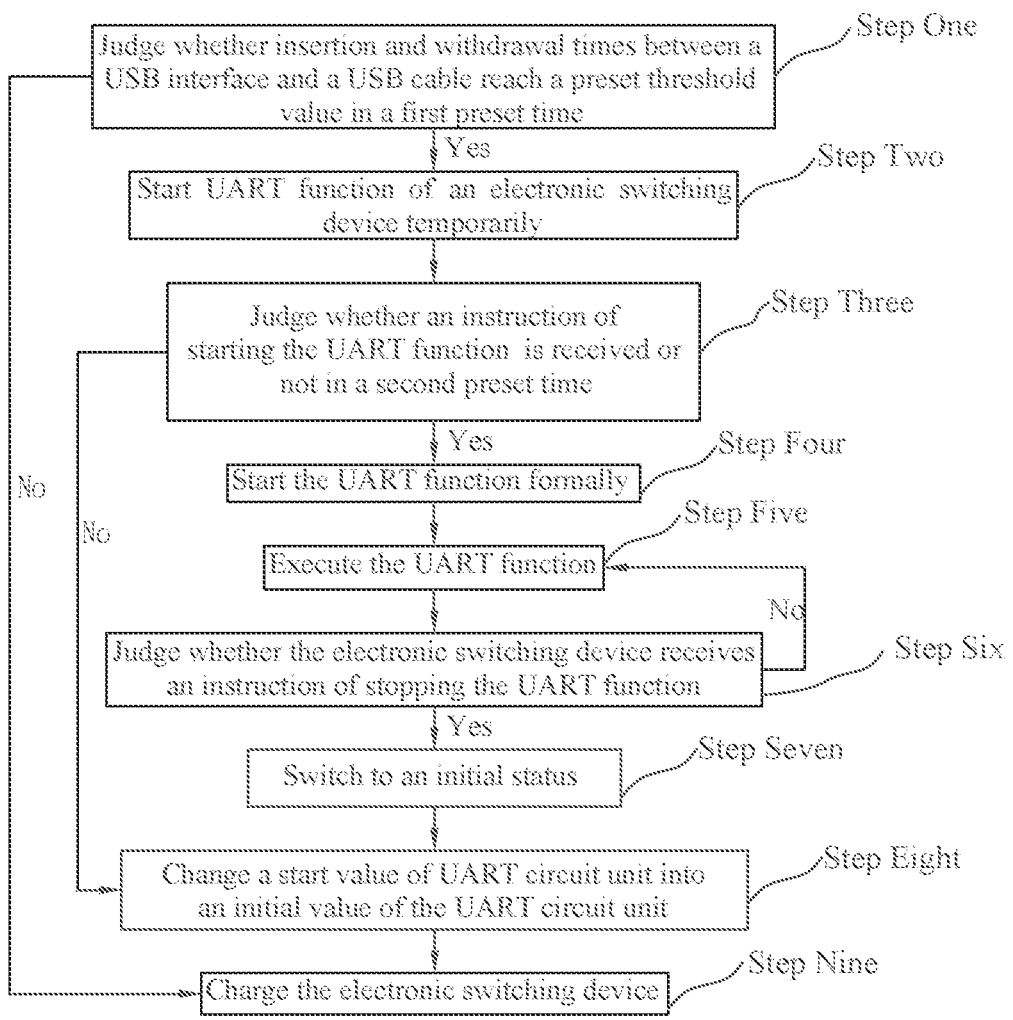
FIG. 3 is a flowchart of a dynamic switching method applied to the electronic switching device in accordance with the preferred embodiment of the present invention.

With reference to FIG. 1 to FIG. 3, an electronic switching device 100 and a dynamic switching method applied thereto in accordance with a preferred embodiment of the present invention are shown. The electronic switching device 100 is applied to an electronic product 400. The electronic switching device 100 includes a USB (Universal Serial Bus) interface 11, a multifunction module 101 which includes a UART (Universal Asynchronous Receiver/Transmitter) circuit unit 12 and a power supply 16, a microprogrammed control module 13, a recognition program unit 14 switching UART function statuses of the UART circuit unit 12 of the electronic switching device 100, and a transient memory 15 disposed in the microprogrammed control module 13. The USB interface 11 of the electronic switching device 100 is connected with a computer 300 through a USB cable 200. The UART circuit unit 12 and the power supply 16 are disposed in the electronic switching device 100. The power supply 16 is chargeable.

After the USB interface 11 of the electronic switching device 100 is connected with the computer 300 through the USB cable 200, the electronic switching device 100 is charged, and the computer 300 applies a windows operating system. The UART circuit unit 12 is connected with the USB interface 11, and the UART circuit unit 12 is in communication with the computer 300 via the USB interface 11. The power supply 16 is electrically connected with the UART circuit unit 12. The power supply 16 is electrically connected with the USB interface 11, and the computer 300 charges the power supply 16 by the USB interface 11. The recognition program unit 14 stores a recognition software program, and the recognition software program is compatible with the operating system of the computer 300. The UART function statuses of the UART circuit unit 12 of the electronic switching device 100 are dynamically switched by the recognition software program of the recognition program unit 14 of the microprogrammed control module 13 of the electronic switching device 100 to start or stop a UART function. Specifically, the microprogrammed control module 13 stores an initial value of the UART circuit unit 12 or a start value of the UART circuit unit 12 in the transient memory 15 to dynamically switch the UART function statuses of the UART circuit unit 12 to stop or start the UART function by the recognition software program of the recognition program unit 14. The UART circuit unit 12 is connected between the USB interface 11 and the microprogrammed control module 13. The USB cable 200 is connected between the electronic switching device 100 and the computer 300. The power supply 16 is connected with the USB interface 11, and the power supply 16 is charged by the computer 300.

The electronic switching device 100 of the electronic product 400 further includes an output module 20 and an input module 30. The output module 20 is connected with an output end 192 of the microprogrammed control module 13, and the input module 30 is connected with an input end 191 of the microprogrammed control module 13. The electronic switching device 100 of the electronic product 400 applying the dynamic switching method to dynamically switch the UART function statuses of the UART circuit unit 12 of the electronic switching device 100 to start or stop the UART function of the UART circuit unit 12 of the electronic switching device 100, and when the USB interface 11 of the electronic switching device 100 receives UART signals and then transmits the UART signals to the computer 300, the windows operating system of the computer 300 is compatible with the recognition software program, and the windows operating system of the computer 300 recognizes the UART signals, so a display screen 31 of the computer 300 will not display information that device is unrecognized.

A block diagram showing that the USB interface 11 of the electronic switching device 100 of the electronic product 400 is connected with the computer 300 through the USB cable 200 is shown in FIG. 1. A flowchart of the dynamic switching method applied to the electronic switching device 100 is shown in FIG. 3. The recognition program unit 14 is a system program unit of the electronic switching device 100. A hardware structure of the electronic switching device 100 includes the USB interface 11, the multifunction module 101 which includes the UART circuit unit 12 and the power supply 16, the microprogrammed control module 13 and a peripheral circuit system 102. The microprogrammed control module 13 is a microcontroller. Specifically, the microprogrammed control module 13 is a microcomputer which is an integrated circuit chip. The microcomputer includes a microprocessor, a storage, a timer, a variety of input and output interfaces, and so on. The microprocessor, the storage, the timer, the variety of the input and output interfaces, and so on are integrated to the integrated circuit chip. Or the microcomputer includes the microprocessor, the storage, a counter, the variety of the input and output interfaces, and so on. The microprocessor, the storage, the counter, the variety of the input and output interfaces, and so on are integrated to the integrated circuit chip. The microprogrammed control module 13 has a motor foot 22, a current foot 23, an ICSPCLK (In-Circuit Serial Programming Clock) foot 24, an ICSPDAT (In-Circuit Serial Programming Data) foot 25, an ICRST (Integrated Circuit Reset) foot 26, a battery voltage foot 27 and a LED foot 28. The motor foot 22, the current foot 23, the ICSPCLK foot 24, the ICSPDAT foot 25, the ICRST foot 26, the battery voltage foot 27 and the LED foot 28 are disposed towards the multifunction module 101, and the motor foot 22, the current foot 23, the ICSPCLK foot 24, the ICSPDAT foot 25, the ICRST foot 26, the battery voltage foot 27 and the LED foot 28 are spaced from the multifunction module 101. In the preferred embodiment, the microprogrammed control module 13 is a single chip microcomputer. The microprogrammed control module 13 is a programmable interrupt controller and the microprogrammed control module 13 belongs to PIC16LF series. The recognition program unit 14 stores the recognition software program, and the recognition program unit 14 is disposed in the microprogrammed control module 13 of the electronic switching device 100.

In the preferred embodiment, the USB interface 11 has four pins which are a first pin 1, a second pin 2, a third pin 3 and a fourth pin 4. The peripheral circuit system 102 includes a first bidirectional diode D4, a second bidirectional diode D5 and a third bidirectional diode D6. The first pin 1 is connected with a positive pole of the first bidirectional diode D4 through a first testing point TP1. The second pin 2 has a transmitting function, and the second pin 2 is connected with a positive pole of the third bidirectional diode D6. The third pin 3 has a receiving function, and the third pin 3 is connected with a positive pole of the second bidirectional diode D5. Each of the first bidirectional diode D4, the second bidirectional diode D5 and the third bidirectional diode D6 has a ground foot 17 which is used for connecting with ground 18. The ground feet 17 of the first bidirectional diode D4, the second bidirectional diode D5 and the third bidirectional diode D6 are connected with one another, and the ground feet 17 of the first bidirectional diode D4, the second bidirectional diode D5 and the third bidirectional diode D6 are connected with the ground 18. The ground feet 17 of the first bidirectional diode D4, the second bidirectional diode D5 and the third bidirectional diode D6 are connected with a second testing point TP3. The second testing point TP3 is connected with the ground 18.

In the preferred embodiment, the UART circuit unit 12 has a transmitting unit 121 and a receiving unit 122. The receiving unit 122 is spaced from the transmitting unit 121. The receiving unit 122 is parallel with the transmitting unit 121. One end of the transmitting unit 121 is connected with the second pin 2 of the USB interface 11. One end of the receiving unit 122 is connected with the third pin 3 of the USB interface 11. The power supply 16 includes a first voltage end V1 and a second voltage end V2. The first voltage end V1 and the second voltage end V2 are respectively connected with the first pin 1 of the USB interface 11. The peripheral circuit system 102 further includes a first resistor R41, a second resistor R40, a third resistor R12 and a fourth resistor R11. The third resistor R12 and the fourth resistor R11 are Oa One end of the first resistor R41 is connected with the first voltage end V1, and the other end of the first resistor R41 is unconnected. One end of the second resistor R40 is connected with the second voltage end V2, and the other end of the second resistor R40 is unconnected. The other end of the transmitting unit 121 is connected with one end of the fourth resistor R11. The other end of the fourth resistor R11 is connected with the ICSPCLK (In-Circuit Serial Programming Clock) foot 24 of the microprogrammed control module 13 and a third testing point TP21. The other end of the fourth resistor R11 is adjacent to the third testing point TP21. The other end of the transmitting unit 121 is connected with the ICSPCLK (In-Circuit Serial Programming Clock) foot 24 of the microprogrammed control module 13 and the third testing point TP21 through the fourth resistor R11. The fourth resistor R11 and the third testing point TP21 are located between the microprogrammed control module 13 and the multifunction module 101. The other end of the receiving unit 122 is connected with one end of the third resistor R12. The other end of the third resistor R12 is connected with the ICSPDAT foot 25 of the microprogrammed control module 13 and a fourth testing point TP 20. The other end of the third resistor R12 is adjacent to the fourth testing point TP 20. The other end of the receiving unit 122 is connected with the ICSPDAT foot 25 of the microprogrammed control module 13 and the fourth testing point TP 20 through the third resistor R12. The third resistor R12 and the fourth testing point TP 20 are located between the microprogrammed control module 13 and the multifunction module 101. A straight-line distance between a point of the microprogrammed control module 13, and the third testing point TP21 and the fourth testing point TP20 is shorter than a straight-line distance between the point of the microprogrammed control module 13, and the third resistor R12 and the fourth resistor R11. The third resistor R12 is located between the other end of the receiving unit 122 and the fourth testing point TP20. The fourth resistor R11 is located between the other end of the transmitting unit 121 and the third testing point TP21. The first voltage end V1 is disposed between the first testing point TP1 and the second voltage end V2. The current foot 23 is connected with a fifth testing point TP19. The third testing point TP21 and the fourth testing point TP20 are aligned along a transverse direction. The third resistor R12 and the fourth resistor R11 are aligned along the transverse direction.

Referring to FIG. 1 to FIG. 3 again, the dynamic switching method is applied to the electronic switching device 100 of the electronic product 400. After the USB interface 11 of the electronic switching device 100 is connected with the computer 300 through the USB cable 200, the UART function statuses of the UART circuit unit 12 of the electronic switching device 100 are dynamically switched by the recognition software program of the recognition program unit 14 of the microprogrammed control module 13 of the electronic switching device 100 to start or stop the UART function. Specific steps of the dynamic switching method of the electronic switching device 100 are described as follows.

Step one: in a first preset time, judge whether insertion and withdrawal times between the USB interface 11 of the electronic switching device 100 and the USB cable 200 reach a preset threshold value by the recognition software program of the recognition program unit 14; if the insertion and withdrawal times between the USB interface 11 of the electronic switching device 100 and the USB cable 200 reach the preset threshold value in the first preset time, execute step two; if the insertion and withdrawal times between the USB interface 11 of the electronic switching device 100 and the USB cable 200 do not reach the preset threshold value in the first preset time, execute step nine. The first preset time is six seconds. The preset threshold value of the insertion and withdrawal times is three times.

That is to say, a purpose of the step one is to judge whether a request of starting the UART function of the electronic switching device 100 temporarily is reached by the recognition program unit 14. Within six seconds, the recognition program unit 14 judges whether the USB cable 200 is inserted into the USB interface 11 of the electronic switching device 100 for three times and the USB cable 200 is withdrawn from the USB interface 11 of the electronic switching device 100 for two times. If the recognition program unit 14 judges truly, execute step two, if the recognition program unit 14 judges falsely, execute step nine: charge the electronic switching device 100 by the computer 300, and the electronic switching device 100 is charged through the USB cable 200.

A specific judging process is described as follows, within six seconds, after the USB cable 200 is inserted into the USB interface 11 of the electronic switching device 100 for the first time, the recognition program unit 14 judges whether the USB cable 200 is withdrawn from the USB interface 11 of the electronic switching device 100, if the USB cable 200 is withdrawn from the USB interface 11 of the electronic switching device 100, the USB cable 200 is inserted into the USB interface 11 of the electronic switching device 100 again, once more, the USB cable 200 is withdrawn from the USB interface 11 of the electronic switching device 100, and then the USB cable 200 is inserted into the USB interface 11 of the electronic switching device 100 for one more time.

Step two: start the UART function of the electronic switching device 100 temporarily by virtue of the recognition program unit 14 changing a value stored in the transient memory 15 of the microprogrammed control module 13 of the electronic switching device 100, and then execute step three. For example, the initial value of the UART circuit unit 12 is 0x00, and the initial value of the UART circuit unit 12 is stored in the transient memory 15 of the microprogrammed control module 13 of the electronic switching device 100, the initial value of the UART circuit unit 12 is changed into the start value of the UART circuit unit 12, the start value of the UART circuit unit 12 is stored in the transient memory 15 of the microprogrammed control module 13 of the electronic switching device 100, the start value of the UART circuit unit 12 is 0xFF, so that the UART function is started.

Step three: the recognition program unit 14 judges whether an instruction of starting the UART function sent is received or not in a second preset time. The instruction of starting the UART function is sent from the computer 300. The instruction of starting the UART function is sent by the USB cable 200. The second preset time is five seconds. If the instruction of starting the UART function is received, execute step four, if the instruction of starting the UART function is not received, execute step eight, the recognition program unit 14 changes the start value of the UART circuit unit 12 into the initial value of the UART circuit unit 12.

The start value of the UART circuit unit 12 stored in the transient memory 15 of the microprogrammed control module 13 of the electronic switching device 100 is 0xFF, after the recognition program unit 14 changes the start value of the UART circuit unit 12 stored in the transient memory 15 of the microprogrammed control module 13 of the electronic switching device 100 into the initial value of the UART circuit unit 12, the initial value of the UART circuit unit 12 stored in the transient memory 15 is 0x00, so that the UART function is stopped.

Step four: if the recognition program unit 14 receives the instruction of starting the UART function in the second preset time, the recognition program unit 14 starts the UART function of the electronic switching device 100 formally, and then execute step five.

Step five: the recognition program unit 14 executes the UART function of the electronic switching device 100 by virtue of the recognition program unit 14 receiving the instruction of starting the UART function, and then execute step six. The UART function is applied in factory production tests, health management and other applications.

Step six: judge whether the electronic switching device 100 receives an instruction of stopping the UART function or not by the recognition program unit 14, and the instruction of stopping the UART function is sent from the computer 300, if the electronic switching device 100 receives the instruction of stopping the UART function, execute step seven, the recognition program unit 14 stops the UART function of the electronic switching device 100, the electronic switching device 100 is switched to a general status, if the electronic switching device 100 does not receive the instruction of stopping the UART function, execute the step five.

Step seven: switch to an initial status, initialize program variables for preparing to change the start value of the UART circuit unit 12, after completing the preparation for changing the start value of the UART circuit unit 12, automatically execute step eight.

Step eight: change the start value of the UART circuit unit 12 into the initial value of the UART circuit unit 12 by the recognition program unit 14. After completing executing the step eight, automatically execute step nine.

Step nine: charge the electronic switching device 100 by the computer 300, and the electronic switching device 100 is charged through the USB cable 200.

As described above, the dynamic switching method applied to the electronic switching device 100 is provided in the present invention, after the USB interface 11 of the electronic switching device 100 is connected with the computer 300 through the USB cable 200, the recognition program unit 14 of the microprogrammed control module 13 of the electronic switching device 100 switches the UART function statuses of the electronic switching device 100. Furthermore, the electronic switching device 100 has multiple advantages, the power supply 16 is connected with the USB interface 11, so that the computer 300 provides electricity to the power supply 16 of the electronic switching device 100 to charge the electronic switching device 100 by the USB cable 200, the UART circuit unit 12 is connected with the USB interface 11 to make the UART circuit unit 12 of the electronic switching device 100 in communication with the computer 300 for satisfying the factory production tests, the health management and other applications. In addition, when the computer 300 is connected with the USB interface 11 to charge the electronic switching device 100 through the USB cable 200, the display screen of the computer 300 will not display the information that the device is unrecognized.

The electronic switching device 100 and the dynamic switching method applied to the electronic switching device 100 which are provided in the present invention have industrial use values, nevertheless, the above-mentioned description is just a description of the preferred embodiment of the present invention, a person whoever is skillful in this skill, may easily proceed with a variety of improvements according to the above-mentioned description, the variety of the improvements completed according to the above-mentioned description still belong to a spirit of the present invention and a patent scope of the present invention limited below.

What is claimed is:

1. A dynamic switching method applied to an electronic switching device, after a USB interface of the electronic switching device is connected with a computer through a USB cable, UART function statuses of the electronic switching device being dynamically switched by a recognition software program of a recognition program unit of a microprogrammed control module of the electronic switching device to start or stop a UART function, the dynamic switching method comprising steps of:

step one: judging whether a number of times the USB cable connected to the electronic switching device is inserted and withdrawn reaches a preset threshold value in a first preset time by the recognition software program of the recognition program unit compatible with an operating system of the computer, if the number of times reaches the preset threshold value in the first preset time, executing step two, if the number of times does not reach the preset threshold value in the first preset time, executing step nine;

step two: starting the UART function of the electronic switching device temporarily by virtue of the recognition program unit changing a value stored in a transient memory of the microprogrammed control module, and then executing step three;

step three: judging whether an instruction of starting the UART function sent by the USB cable and sent from the computer is received or not in a second preset time, if the instruction of starting the UART function sent by the USB cable and sent from the computer is received in the second preset time, executing step four, if the instruction of starting the UART function sent by the USB cable and sent from the computer is not received in the second preset time, executing step eight;

step four: if the recognition program unit receives the instruction of starting the UART function in the second preset time, the recognition program unit starting the UART function of the electronic switching device formally, and then executing step five;

step five: executing the UART function of the electronic switching device by virtue of the recognition program unit receiving the instruction of starting the UART function, and then executing step six;

step six: judging whether the electronic switching device receives an instruction of stopping the UART function sent from the computer or not by the recognition program unit, if the electronic switching device receives the instruction of stopping the UART function sent from the computer, the recognition program unit stopping the UART function of the electronic switching device, the electronic switching device being switched to a general status, and executing step seven, if the electronic switching device does not receive the instruction of stopping the UART function sent from the computer, executing the step five;

step seven: switching to an initial status, initializing program variables for preparing to change a start value of a UART circuit unit stored in the transient memory, after completing the preparation for changing the start value of the UART circuit unit, automatically executing step eight;

step eight: changing the start value of the UART circuit unit which is stored in the transient memory of the microprogrammed control module into an initial value of the UART circuit unit which is stored in the transient memory by the recognition program unit, after completing executing the step eight, automatically executing the step nine; and step nine: charging the electronic switching device by the computer and through the USB cable.

2. The dynamic switching method as claimed in claim 1, wherein the preset threshold value is that the USB cable connected to the electronic switching device is inserted three times and withdrawn two times.

3. The dynamic switching method as claimed in claim 1, wherein the first preset time is six seconds.

4. The dynamic switching method as claimed in claim 1, wherein the second preset time is five seconds.

5. The dynamic switching method as claimed in claim 1, wherein the electronic switching device is applied to an electronic product, and the UART function is applied in factory production tests and health managements.

6. The dynamic switching method as claimed in claim 1, wherein the computer applies a windows operating system.

7. A dynamic switching method applied to an electronic switching device, after a USB interface of the electronic switching device is connected with a computer through a USB cable, UART function statuses of the electronic switching device being dynamically switched by a recognition software program of a recognition program unit of a microprogrammed control module of the electronic switching device to start or stop a UART function, the dynamic switching method comprising steps of:

step one: judging whether a number of times the USB cable connected to the electronic switching device is inserted and withdrawn reaches a preset threshold value in a first preset time by the recognition software program of the recognition program unit compatible with an operating system of the computer, if the number of times reaches the preset threshold value in the first preset time, executing step two;

step two: starting the UART function of the electronic switching device temporarily by virtue of the recognition program unit changing a value stored in a transient memory of the microprogrammed control module, and then executing step three;

step three: judging whether an instruction of starting the UART function sent by the USB cable and sent from the computer is received or not in a second preset time, if the instruction of starting the UART function sent by the USB cable and sent from the computer is received in the second preset time, executing step four;

step four: if the recognition program unit receives the instruction of starting the UART function in the second preset time, the recognition program unit starting the UART function of the electronic switching device formally, and then executing step five;

step five: executing the UART function of the electronic switching device by virtue of the recognition program unit receiving the instruction of starting the UART function, and then executing step six;

step six: judging whether the electronic switching device receives an instruction of stopping the UART function sent from the computer or not by the recognition program unit, if the electronic switching device receives the instruction of stopping the UART function sent from the computer, the recognition program unit stopping the UART function of the electronic switching device, the electronic switching device being switched to a general status, and executing step seven, if the electronic switching device does not receive the instruction of stopping the UART function sent from the computer, executing the step five;

step seven: switching to an initial status, and automatically executing step eight;

step eight: changing a start value of a UART circuit unit which is stored in the transient memory into an initial value of the UART circuit unit which is stored in the transient memory by the recognition program unit, after completing executing the step eight, automatically executing step nine; and step nine: charging the electronic switching device by the computer and through the USB cable.

8. The dynamic switching method as claimed in claim 7, wherein in the step three, if the instruction of starting the UART function sent by the USB cable and sent from the computer is not received, execute the step eight.

9. The dynamic switching method as claimed in claim 7, wherein the preset threshold value is that the USB cable connected to the electronic switching device is inserted three times and withdrawn two times.

10. The dynamic switching method as claimed in claim 7, wherein the first preset time is six seconds.

11. The dynamic switching method as claimed in claim 7, wherein the second preset time is five seconds.

12. The dynamic switching method as claimed in claim 7, wherein if the number of times does not reach the preset threshold value in the first preset time, execute the step nine.

* * * * *